US012597033B2

(12) United States Patent
Pianta et al.

(10) Patent No.: US 12,597,033 B2
(45) Date of Patent: Apr. 7, 2026

(54) MACHINE LEARNING FOR FRAUD PREVENTION ACROSS PAYMENT TYPES

(71) Applicant: Stripe, Inc., South San Francisco, CA (US)

(72) Inventors: Anthony Pianta, Washington, DC (US); Peter Lofgren, Palo Alto, CA (US); Ketan Singh, Sunnyvale, CA (US)

(73) Assignee: Stripe, Inc., South San Francisco, CA (US)

(*) Notice: Subject to any disclaimer, the term of this patent is extended or adjusted under 35 U.S.C. 154(b) by 252 days.

(21) Appl. No.: 17/866,370

(22) Filed: Jul. 15, 2022

(65) Prior Publication Data

US 2024/0020700 A1 Jan. 18, 2024

(51) Int. Cl.
*G06Q 20/40* (2012.01)
*G06F 18/214* (2023.01)

(52) U.S. Cl.
CPC ....... *G06Q 20/4016* (2013.01); *G06F 18/214* (2023.01)

(58) Field of Classification Search
CPC . G06Q 20/4016; G06Q 20/405; G06F 18/214
See application file for complete search history.

(56) References Cited

U.S. PATENT DOCUMENTS 10,009,358 B1 * 6/2018 Xie ........................ G06F 21/552
10,867,303 B1 * 12/2020 Manapat .............. G06Q 10/067

10,949,825 B1 * 3/2021 Brosamer ............ G06Q 20/202
11,063,881 B1 * 7/2021 Vijayasuganthan .. H04L 47/748
11,334,892 B2 * 5/2022 Hamooni ........... G06Q 20/4016
11,880,842 B2 * 1/2024 Piel .................... G06Q 20/4016
2011/0282778 A1 * 11/2011 Wright .................. G06Q 40/00
705/38
2012/0158585 A1 * 6/2012 Ganti ..................... G06Q 20/40
705/44
2014/0164154 A1 * 6/2014 Ramaci ............. G06Q 20/3674
705/16

(Continued)

OTHER PUBLICATIONS

Takemori et al., Detection of Bot Infected PCs Using Destination-based IP and Domain Whitelists during a Non-operating Term, 2008, IEEE "GLOBECOM" 2008 proceedings, (Year: 2008).*

*Primary Examiner* — Yingying Zhou

(74) *Attorney, Agent, or Firm* — Foley & Lardner LLP

(57) ABSTRACT

In an example embodiment, a solution is provided wherein a single machine learning model is trained and used to detect fraud across multiple payment types. More particularly, the concept of a payment scoring event (PSE) is introduced. A PSE is a data structure that stores multiple pieces of information about a transaction (or potential transaction). A mapping is then maintained between each payment type to be supported and the PSE structure. Each of these transaction types may have its own mapping indicating which fields in the PSR its own fields map to. The use of these mappings allows for additional payment methods to be introduced and supported at any time, necessitating only the creation of a mapping for an additional payment method.

23 Claims, 6 Drawing Sheets

(56)                    References Cited

U.S. PATENT DOCUMENTS

| | | | |
|---|---|---|---|
| 2016/0034900 A1* | 2/2016 | Nelsen | G06F 21/31 |
| | | | 705/44 |
| 2016/0048937 A1* | 2/2016 | Mathura | G06Q 40/12 |
| | | | 705/30 |
| 2017/0012960 A1* | 1/2017 | Idika | G06F 21/55 |
| 2018/0108015 A1* | 4/2018 | Rogas | H04L 61/4552 |
| 2018/0247312 A1* | 8/2018 | Loganathan | G06Q 20/4014 |
| 2018/0330258 A1* | 11/2018 | Harris | G06N 7/01 |
| 2019/0147430 A1* | 5/2019 | Chen | G06F 18/2155 |
| | | | 705/40 |
| 2020/0120127 A1* | 4/2020 | Tyers | H04L 63/0236 |
| 2020/0279288 A1* | 9/2020 | Song | G06N 3/08 |
| 2020/0364718 A1* | 11/2020 | Hindi | G06Q 20/4016 |
| 2020/0387835 A1* | 12/2020 | Sandepudi | G06N 20/20 |
| 2020/0396233 A1* | 12/2020 | Luo | G06N 3/08 |
| 2021/0182830 A1* | 6/2021 | Edwards | G06N 20/00 |
| 2021/0398129 A1* | 12/2021 | Sharma | G06N 3/045 |
| 2021/0398146 A1* | 12/2021 | Ivanov | H04L 63/1416 |
| 2022/0101288 A1* | 3/2022 | Georgiadis | G06Q 20/3267 |
| 2022/0101310 A1* | 3/2022 | Kumar | G06Q 20/4016 |
| 2022/0188831 A1* | 6/2022 | Snyder | G06Q 20/18 |
| 2022/0215393 A1* | 7/2022 | Lenkala | G06Q 20/4015 |
| 2022/0318573 A1* | 10/2022 | Smith | G06F 18/2148 |
| 2022/0366493 A1* | 11/2022 | Arora | G06Q 40/03 |
| 2022/0385569 A1* | 12/2022 | Kolar | H04L 45/08 |
| 2023/0011209 A1* | 1/2023 | Fenichel | G06Q 20/4016 |
| 2023/0118240 A1* | 4/2023 | Wong | G06N 3/045 |
| | | | 705/44 |
| 2023/0196367 A1* | 6/2023 | Zhuge | G06Q 20/382 |
| | | | 705/39 |
| 2023/0360049 A1* | 11/2023 | Ammatanda | G06Q 30/0201 |
| 2023/0419402 A1* | 12/2023 | Ghelichi | G06N 5/01 |
| 2024/0135359 A1* | 4/2024 | Smadja | G06Q 20/346 |

* cited by examiner

POWER

106

PUBLICATION SYSTEM

210

INTERFACE COMPONENT

300

PAYMENT PROCESSOR COMPONENT

110

NETWORK

MACHINE LEARNING FOR FRAUD PREVENTION ACROSS PAYMENT TYPES

TECHNICAL FIELD

The subject matter disclosed herein generally relates to machine learning. More particularly, the subject matter disclosed herein relates to the use of machine learning for fraud prevention across multiple payment types.

BACKGROUND

Machine learning is used in a wide variety of applications. In some applications, a classifier model, trained through machine learning, is used to output one or more classifications of input data. One such example application is in the field of credit card fraud detection. Online payment systems and payment processors have allowed for many different types of payments to be processed. For example, an online payment system may offer merchants the option to accept credit cards, debit cards, direct money transfers (such as Automated Clearing House (ACH) transactions), Alternative Payment Methods (APMs), also known as Local Payment Methods (LPMs), Single Euro Payments Area (SEPA), etc.

Machine learning has been utilized to aid in fraud prevention within single payment types. For example, many credit card companies use machine learning models to predict the likelihood of a particular requested transaction being fraudulent, and to block transactions that are likely to be fraudulent. Such techniques are useful when a large percentage of the potential transactions are within the same payment method, but are not able to be used when potential transacts are spread across many different payment types.

Additionally, a merchant's tolerance for potential fraud may vary based on the payment type. Certain types of transactions are easier to reverse and/or claw back after the fact than others. Credit card payments, for example, are fairly easy to reverse and/or claw back after a fraudulent transaction has been detected, but ACH transactions are the opposite. There is currently no mechanism, however, to allow for such different tolerances between payment types.

BRIEF DESCRIPTION OF THE DRAWINGS

Some embodiments are illustrated by way of example and not limitation in the figures of the accompanying drawings.

DETAILED DESCRIPTION

Figure 1:
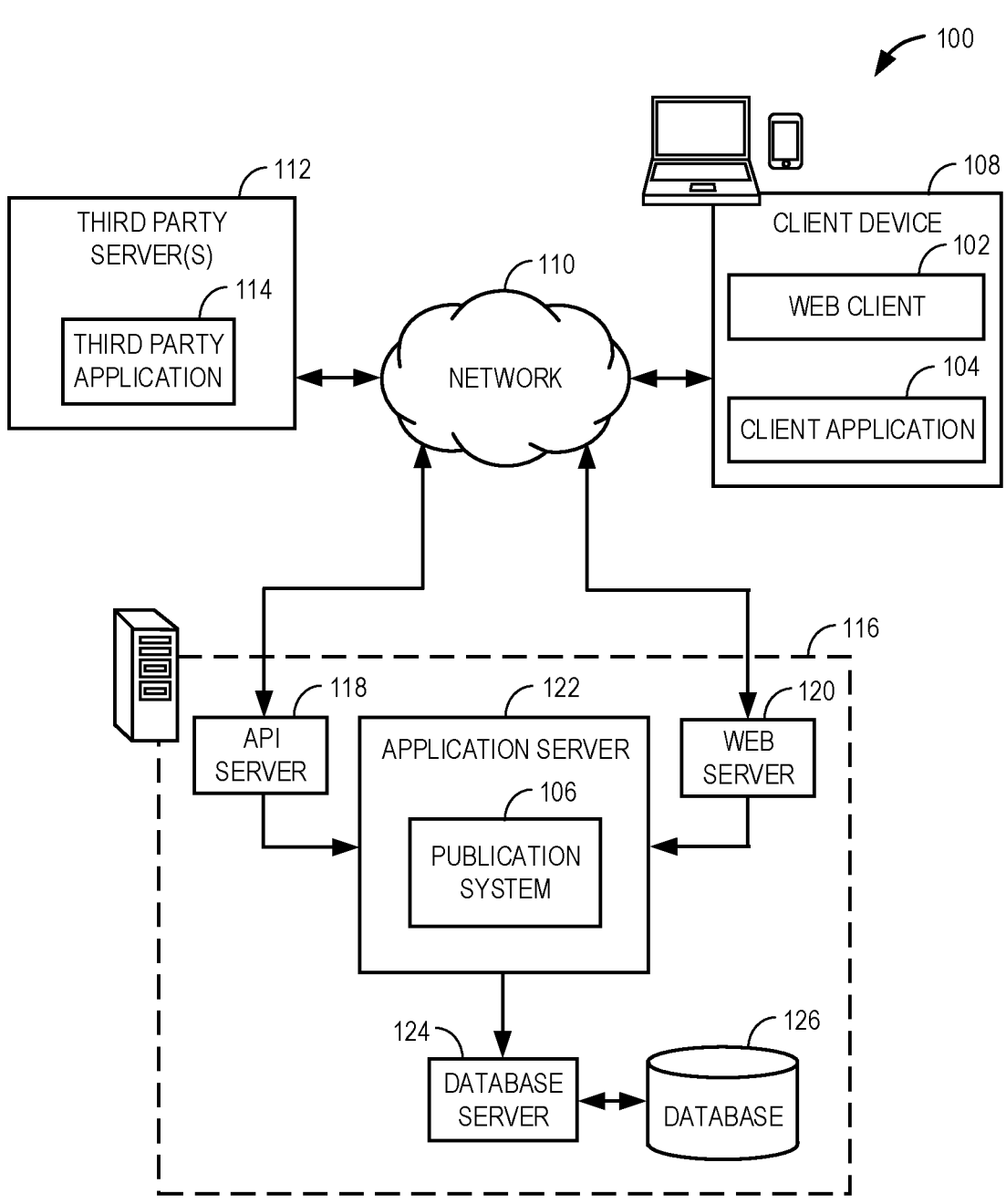
FIG. 1 is a block diagram illustrating a high-level network architecture, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Security of a transaction network may be comprised by various types of fraudulent transactions. As such, a mechanism that reduces the number of fraudulent transactions increases the security of the transaction network.

In an example embodiment, a solution is provided wherein a single machine learning model is trained and used to detect fraud across multiple payment types. More particularly, the concept of a payment scoring event (PSE) is introduced. A PSE is a data structure that stores multiple pieces of information about a transaction (or potential transaction). A mapping is then maintained between each payment type to be supported, and the PSE structure. For example, the PSE may be designed with 25 different fields pertaining to transactions. One particular transaction type might have 30 different fields pertaining to transactions whereas another particular transaction type might have 27 different fields pertaining to transactions. Each of these transaction types may have its own mapping, indicating which fields in the PSR its own fields map to. The use of these mappings allows for additional payment methods to be introduced and supported at any time, necessitating only the creation of a mapping for an additional payment method.

Training data may be formed mapping historical transaction data from the various payment methods into PSEs and joining these PSEs with labels. These labels may come from information about what actually occurred in each of the corresponding transactions, potentially obtained from the various payment methods (e.g., the credit card processor, the bank that processed the ACH transaction, etc.). In an example embodiment, these labels may include "failed" (the money failed to move, such as for insufficient funds on an ACH transaction or decline of a card), "fraud" (fraud was reported for the transaction), "refunded" (a refund was processed for the transaction), "blocked" (the transaction was blocked), and "disputed non-fraud" (the money moved to the merchant, then back to the consumer at the consumer's request, for a non-fraud reason such as product not received). Notably, a label for "successful" is not necessary. This is because in most payment types a success event is not generated. However, one variation would be to assign a label such as "tentatively successful" for a short time period (e.g., a few weeks) after a transaction, and then later mark that as "successful." This time period may be varied for each payment type, based on the percentage of successful transactions that have occurred after that time period (e.g., if 80% of the payments are received after 3 weeks, then 3 weeks may be set as that time period).

One or more features may then be either extracted directly from the PSEs, or calculated based on some combination of information from the PSEs and labels. For example, transaction location may be extracted directly from a PSE, but a feature such as fraud rate on Internet Protocol (IP) address (the fraction of payments on the particular IP address that were fraud) may be calculated from the PSEs and labels.

Features generally will include user supplied data such as email address, physical address, payment method, session collected data such as IP address and browser user agent (essentially an identification of the web browser the user was using), and counter features. Counter features are features that apply across transaction type. For example, if fraud was detected in a transaction that used the same IP address but with a separate payment method, that might imply the likelihood of another transaction using that same IP address is also fraudulent.

Another example of a counter feature is the fact that a bank account is used in a lot of transactions with different email addresses or different IP addresses.

With reference to FIG. 1, an example embodiment of a high-level SaaS network architecture 100 is shown. A networked system 116 provides server-side functionality via a network 110 (e.g., the Internet or a WAN) to a client device 108. A web client 102 and a programmatic client, in the example form of a client application 104, are hosted and execute on the client device 108. The networked system 116 includes an application server 122, which in turn hosts a publication system 106 (such as the publication system hosted at https://stripe.com by Stripe, Inc. of San Francisco, CA (herein "Stripe") as an example of a payment processor) that provides a number of functions and services to the client application 104 that accesses the networked system 116. The client application 104 also provides a number of interfaces described herein, which can present an output in accordance with the methods described herein to a user of the client device 108.

The client device 108 enables a user to access and interact with the networked system 116 and, ultimately, the publication system 106. For instance, the user provides input (e.g., touch screen input or alphanumeric input) to the client device 108, and the input is communicated to the networked system 116 via the network 110. In this instance, the networked system 116, in response to receiving the input from the user, communicates information back to the client device 108 via the network 110 to be presented to the user.

An API server 118 and a web server 120 are coupled, and provide programmatic and web interfaces respectively, to the application server 122. The application server 122 hosts the publication system 106, which includes components or applications described further below. The application server 122 is, in turn, shown to be coupled to a database server 124 that facilitates access to information storage repositories (e.g., a database 126). In an example embodiment, the database 126 includes storage devices that store information accessed and generated by the publication system 106.

Additionally, a third-party application 114, executing on one or more third-party servers 112, is shown as having programmatic access to the networked system 116 via the programmatic interface provided by the API server 118. For example, the third-party application 114, using information retrieved from the networked system 116, may support one or more features or functions on a website hosted by a third party.

Turning now specifically to the applications hosted by the client device 108, the web client 102 may access the various systems (e.g., the publication system 106) via the web interface supported by the web server 120. Similarly, the client application 104 (e.g., an "app" such as a payment processor app) accesses the various services and functions provided by the publication system 106 via the programmatic interface provided by the API server 118. The client application 104 may be, for example, an "app" executing on the client device 108, such as an iOS or Android OS application to enable a user to access and input data on the networked system 116 in an offline manner and to perform batch-mode communications between the client application 104 and the networked system 116.

Further, while the SaaS network architecture 100 shown in FIG. 1 employs a client-server architecture, the present inventive subject matter is of course not limited to such an architecture, and could equally well find application in a distributed, or peer-to-peer, architecture system, for example. The publication system 106 could also be implemented as a standalone software program, which does not necessarily have networking capabilities.

Figure 2:
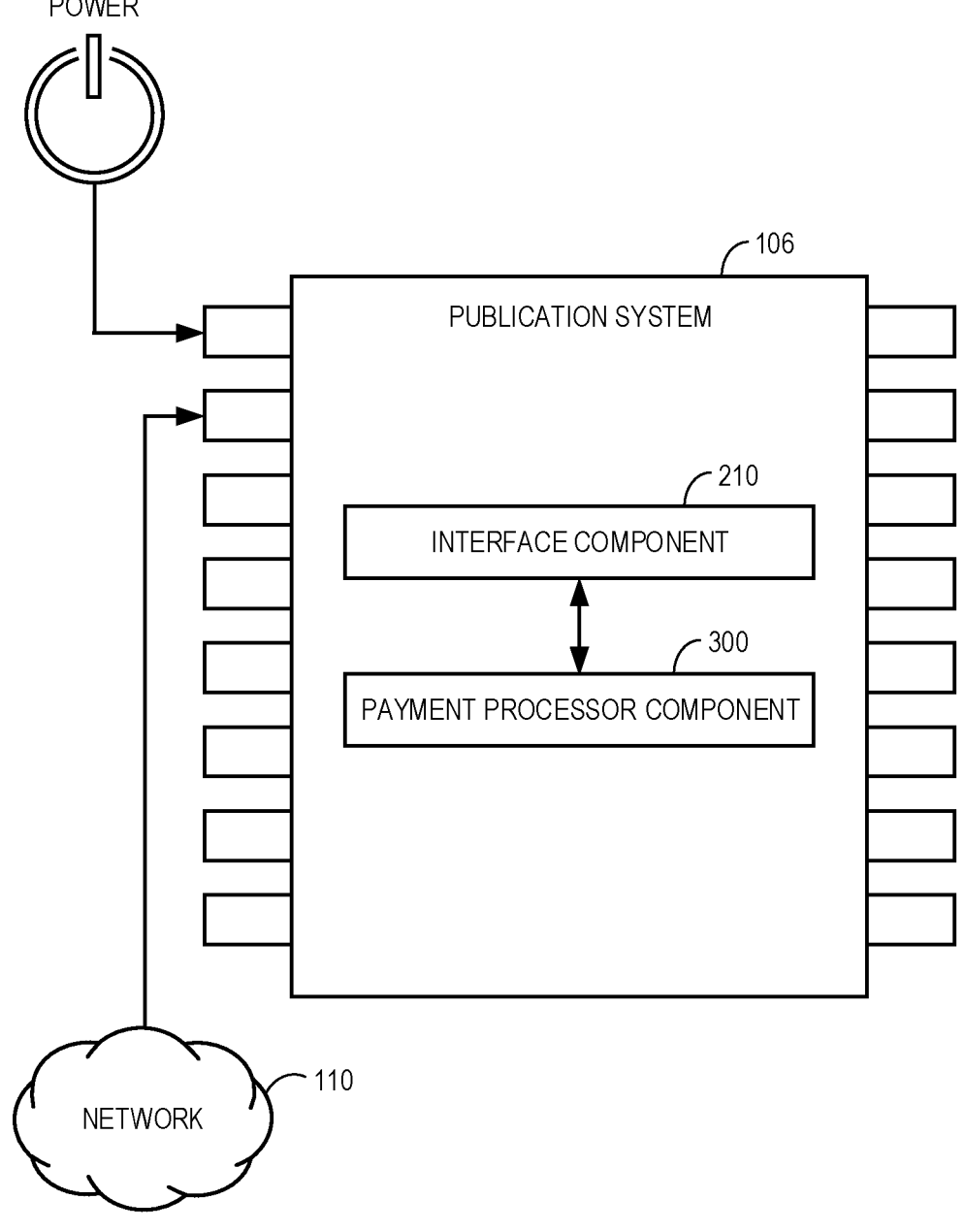
FIG. 2 is a block diagram showing architectural aspects of a publication system, according to some example embodiments.

FIG. 2 is a block diagram showing architectural details of a publication system 106 of FIG. 1, according to some example embodiments. Specifically, the publication system 106 is shown to include an interface component 210 by which the publication system 106 communicates (e.g., over a network 110) with other systems within the SaaS network architecture 100.

Figure 3:
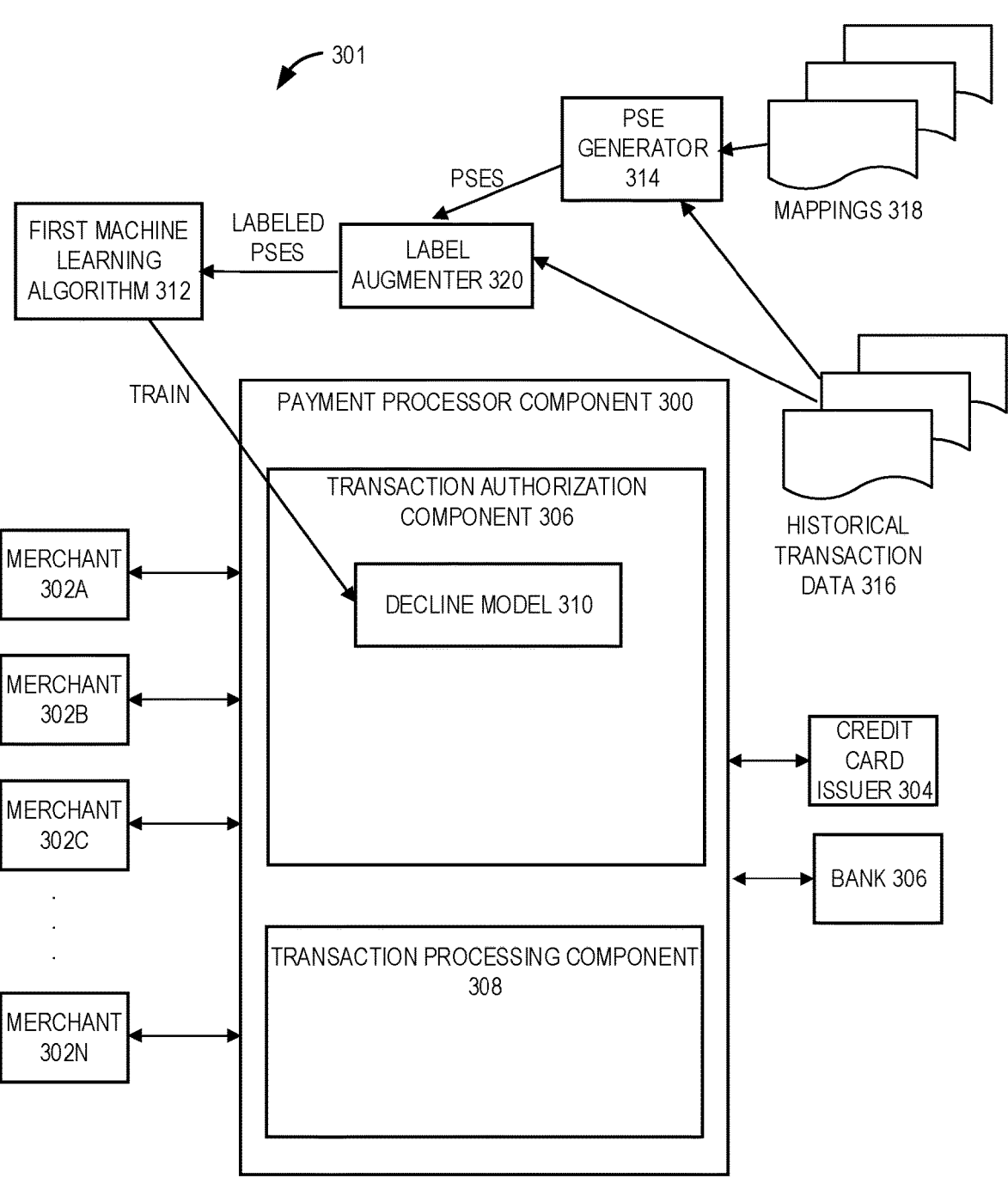
FIG. 3 is a block diagram illustrating a system, according to some example embodiments.

The interface component 210 is communicatively coupled to a payment processor component 300 of FIG. 3 that operates to provide payment processing functions for a payment processor in accordance with the methods described herein with reference to the accompanying drawings.

FIG. 3 is a block diagram illustrating a system 301 in accordance with an example embodiment. The system includes the payment processor component 300 from FIG. 2, which communicates with one or more merchants 302A-302N as well as with credit card issuer 304, and bank 306 via network 110. It should be noted that while only a single credit card issuer 304 and bank 306 are shown here, in actuality the payment processor component 300 may have connections available to many credit card issuers and banks, as well as any other entities necessary to process a transaction using any allowed payment type.

Payment processor component 300 includes a transaction authorization component (bank 306) and a transaction processing component 308. The transaction processing component 308 takes as input information about a potential transaction from a merchant 302A-302N. It then decides whether or not to request validation for the transaction from the credit card issuer 304 and/or bank. As will be explained in more detail below, it utilizes a decline model 310 to make this decision. When validation requests are made, they are sent to the credit card issuer 304 and/or bank 306, which then make a final decision as to whether to indicate that the transaction is valid this final decision to the payment processor component 300.

Separately, once the potential transaction has been accepted (via an accept on a separate authorization request), the transaction processing component 308 processes the payment itself, via communication with the credit card issuer 304 and/or bank 306.

The decline model 310 is a machine learning model trained by a first machine learning algorithm 312 to predict a likelihood that a particular transaction (of one of a plurality of different payment types) is fraudulent or otherwise malicious. It should be noted that for purposes of the present disclosure, the term "fraudulent" is used broadly to refer to any behavior that is likely to result in the payee not receiving or not being able to keep funds that were designated to be paid to them during the transaction. In other words, it can cover actions that may not meet the legal definition of "fraud," but are still ones that the payee would likely wish to avoid. Thus, for purposes of this disclosure, the term "fraudulent" shall be interpreted to include any negative behavior, whether intentionally malicious or not, that would negatively impact the likelihood of the payee ultimately getting to receive and keep the funds that are a part of the transaction.

The first machine learning algorithm may iterate among various parameters, changing parameters (weights) multiplied by various input variables and evaluating a loss function at each iteration, until the loss function is minimized, at which stage the parameters for that stage are learned. The training data may include labeled data, as described earlier. Specifically, the weights are multiplied by the input variables as part of a weighted sum operation, and the weighted sum operation is used by the loss function.

The first machine learning algorithm may also be selected from among many other different potential supervised or unsupervised machine learning algorithms. Examples of supervised learning algorithms include artificial neural networks, Bayesian networks, instance-based learning, support vector machines, linear classifiers, quadratic classifiers, k-nearest neighbor, decision trees, and hidden Markov models.

In an example embodiment, the first machine learning algorithm is a supervised gradient boosted trees algorithm, such as an XG Boost machine learning algorithm. XG Boost supports a gradient boosting algorithm, stochastic gradient boosting, and regularized gradient boosting. It makes efficient use of compute time and memory resources and is sparse-aware (about to automatically handle missing data values), supporting block structure (which allows the parallelization of tree construction), and supporting retraining.

In other example embodiments, the first machine learning algorithm is a deep neural network, or a combination of deep neural network components and XG Boost components.

The machine learning model can also be retrained by passing new training data, some of which may have been labeled via user feedback, to the first machine learning algorithm at a later time.

Features used by the first machine learning algorithm (as well as by the trained decline model) may include, but are not limited to, time features (day of week, hour of day, timezone, etc.), customer data (email address, billing address, time since created, etc.), client data (Internet Protocol address, request headers, browser, operating system, session identification, etc.), card metadata (bank identification number (BIN), bank, country, prepaid, debit or credit, etc.), payment data (amount, currency, shipping address, etc.), and historical counters across many dimensions (card, email address, customer, merchant, IP address, etc.).

As mentioned above, the training data used by the first machine learning algorithm may include PSEs that have been labeled. Here, PSE generator 314 takes historical transaction data 316 and puts it into PSE format using one or more mappings 318. More particularly, one or more values in the historical transaction data can be mapped to a field in a PSE schema in the one or more mappings 318. In an example embodiment, each payment type has its own mapping 318.

The PSEs can then be augmented with labels by a label augmenter 320 using actual results of the transactions from the historical transaction data 316. The labeled PSEs are then used as training data for the first machine learning algorithm 312.

At runtime, the trained decline model 310 can also use PSEs generated by the PSE generator 314, albeit from current potential transactions (i.e., transactions that have been requested or submitted for processing but not yet processed) rather than historical transactions.

In an example embodiment, the output of the decline model 310 is a score indicating a likelihood that the potential transaction is fraudulent. What is then done with that score can depend on the implementation and the merchant. In an example embodiment, one or more thresholds are used to classify the score into one of a plurality of different classes or categories. For example, scores higher than a first threshold may be considered "safe" and may be processed immediately, while scores lower than a second threshold may be considered "unsafe" and rejected immediately. Scores between the first threshold and the second threshold may be considered "potentially unsafe" or "medium unsafe", and one or more various interventions may be initiated. For example, for a "potentially unsafe" or "medium unsafe" transaction, the payor may be prompted to verify the physical payment card, such as by answering security questions or holding up the card to a mobile device camera to prove they are in possession of the card, via a photograph taken by the camera. Another example would be requiring a two-factor authentication be passed prior to proceeding with the transaction.

In an example embodiment, these thresholds are completely configurable by the merchants 302A-302N, based on their own tolerance for potential fraud. Certain companies, for example, may value growth above the bottom line and may be less concerned about losing money to fraudulent transactions than in creating friction for transactions, and thus may wish for their thresholds to be set higher. Additionally, the thresholds need not be the same for all transactions of the merchant. Any variable of a transaction can be used as a basis for a particular setting for a threshold. For example, a merchant may set lower thresholds for ACH transactions than credit card transactions, due to the increased chance of fraud. The merchant can also set higher thresholds for low value transactions (e.g., less than $100) than for high value transactions.

By making the thresholds configurable by the merchants, the overall security of the transaction network is increased, as each merchant is able to feel comfortable that their own tolerance for fraudulent transactions is being independently considered, in contrast to networks where a single threshold for all merchants is used, and merchants with very low tolerance for fraudulent transactions feel less secure because the threshold is set in a manner that attempts to placate all merchants, including those who have a high tolerance for fraudulent transactions.

Furthermore, in an example embodiment, either historical transaction data or potential transaction data (or both) may be transformed and/or enriched prior to use as either retraining data or input to the model at runtime. This may include, for example, normalizing addresses to known addresses, augmenting a raw IP address with a geographical location, and adding indicators that the transaction was performed via a VPN or from a known bot IP address to the transaction data.

Furthermore, in some example embodiments, machine learning is used more than just for a decline model but may also be used to predict the thresholds themselves (such as to recommend threshold levels for particular merchants based on historical merchant behavior and merchant attributes) or to suggest interventions (based on historical intervention effectiveness).

Figure 4:
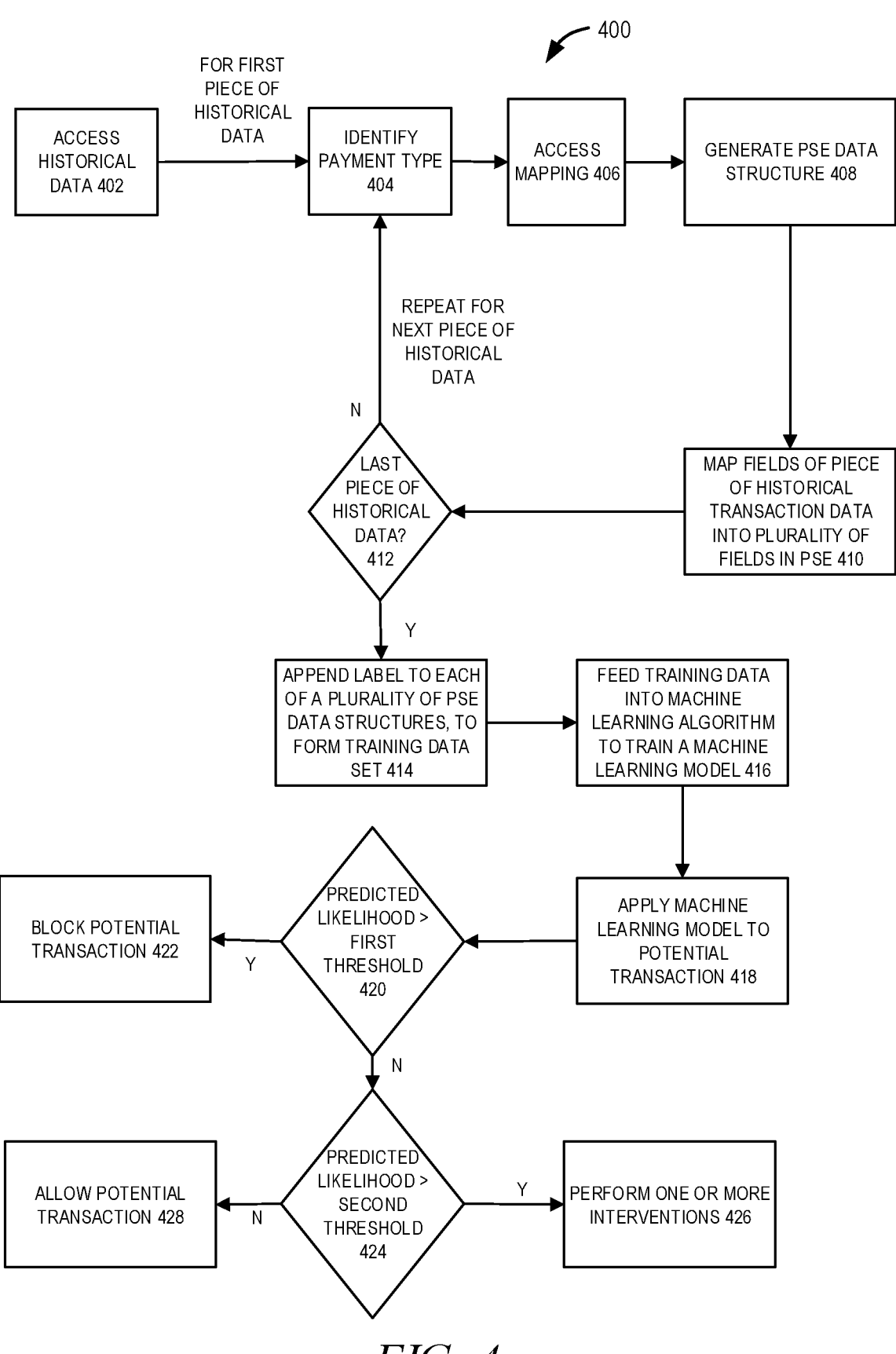
FIG. 4 is a flow diagram illustrating a method of training a machine learning model, according to some example embodiments

FIG. 4 is a flow diagram illustrating a method 400 of training a machine learning model in accordance with an example embodiment. At operation 402, historical transaction data is accessed. A loop is then begun for each piece of historical transaction data. At operation 404, a payment type associated with a corresponding transaction is identified. At operation 406, a mapping for the payment type associated with the corresponding transaction is accessed. At operation 408, a PSE data structure comprising a plurality of fields is generated. At operation 410, fields on the piece of historical transaction data are mapped into the plurality of fields in the PSE data structure, based on the mapping for the payment type associated with the corresponding transaction. At operation 412, it is determined if this is the last piece of historical transaction data being examined. If not, then the method 400 loops back to operation 404 for the next piece of historical data.

If so, then at operation 414, a label is appended to each of a plurality of PSE data structures, corresponding to a plurality of different payment types, to form a training data set. At operation 416, the training data set is fed into a machine learning algorithm to train a machine learning model to predict a likelihood that a transaction is fraudulent. At operation 418, the trained machine learning model is applied to a potential transaction to predict the likelihood that the potential transaction is fraudulent. At operation 420, comparing the predicted likelihood that the potential transaction is fraudulent is compared to a first threshold. If the first threshold is exceeded, then at operation 422 the potential transaction is blocked.

At operation 424, the predicted likelihood that the potential transaction is compared to a second threshold. If the predicted likelihood exceeds the second threshold (but does not exceed the first threshold), then at operation 426, one or more interventions are performed and blocking the potential transaction if the one or more interventions are not satisfied. If not, then at operation 428 the potential transaction is allowed.

When a potential transaction is blocked, the transaction may be prevented from processing. Additionally, a graphical user interface of one or more users may be notified so that they display an indication that the transaction has been blocked. One of these users may be, for example, a transaction initiator, such as a buyer, who then may have the opportunity to attempt a different payment method to complete the transaction. Another of the users may be, for example, a user associated with a merchant who is receiving the transaction.

Figure 5:
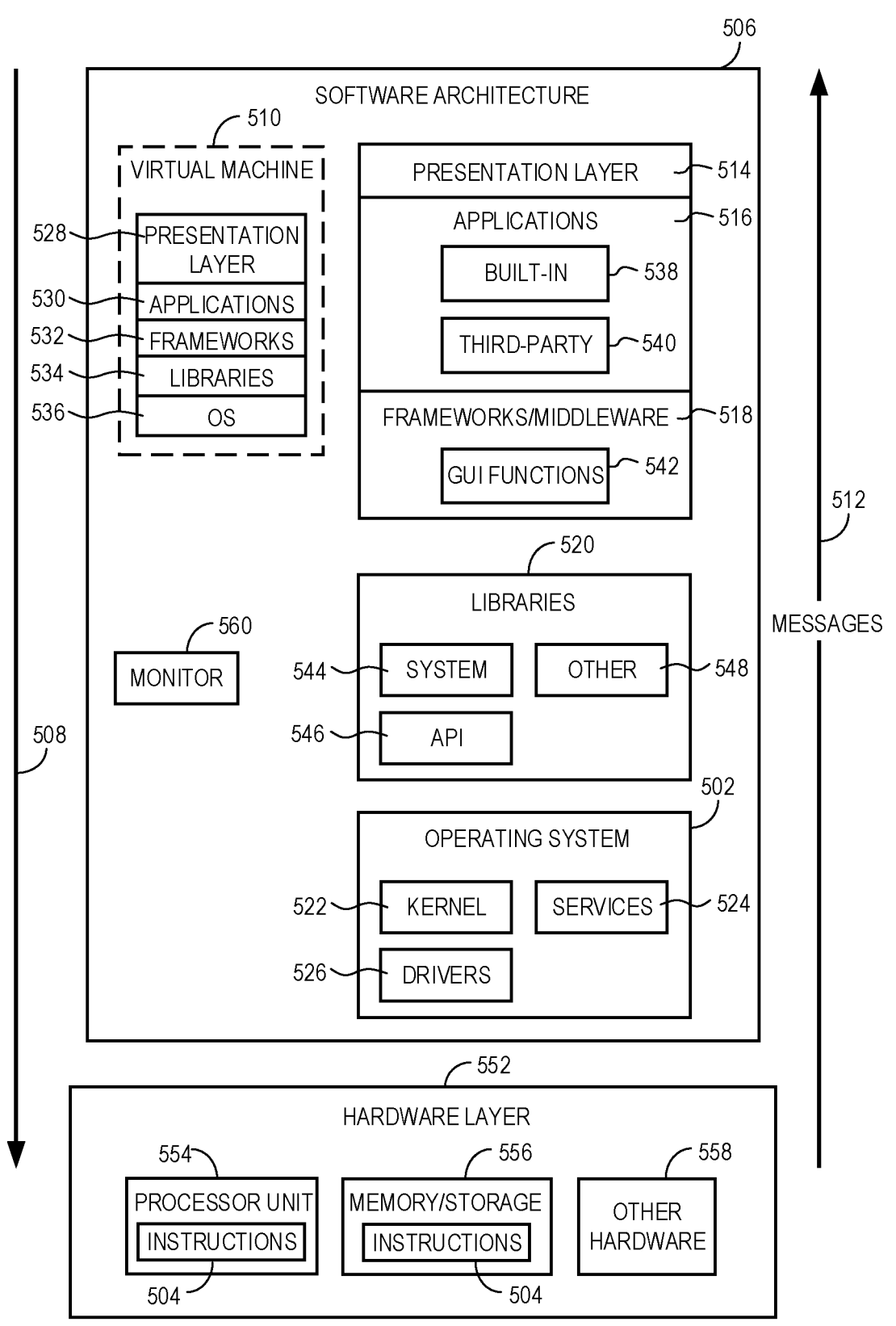
FIG. 5 is a block diagram illustrating an example software architecture, which may be used in conjunction with various hardware architectures herein described.

FIG. 5 is a block diagram illustrating an example software architecture 506, which may be used in conjunction with various hardware architectures herein described. FIG. 5 is a non-limiting example of a software architecture 506, and it will be appreciated that many other architectures may be implemented to facilitate the functionality described herein. The software architecture 506 may execute on hardware such as a machine 600 of FIG. 6 that includes, among other things, processors 604, memory/storage 606, and input/output (I/O) components 618. A representative hardware layer 552 is illustrated and can represent, for example, the machine 600 of FIG. 6. The representative hardware layer 552 includes a processor 554 having associated executable instructions 504. The executable instructions 504 represent the executable instructions of the software architecture 506, including implementation of the methods, components, and so forth described herein. The hardware layer 552 also includes memory and/or storage modules as memory/storage 556, which also have the executable instructions 504. The hardware layer 552 may also comprise other hardware 558.

In the example architecture of FIG. 5, the software architecture 506 may be conceptualized as a stack of layers where each layer provides particular functionality. For example, the software architecture 506 may include layers such as an operating system 502, libraries 520, frameworks/middleware 518, applications 516, and a presentation layer 514. Operationally, the applications 516 and/or other components within the layers may invoke API calls 508 through the software stack and receive a response as messages 512 in response to the API calls 508. The layers illustrated are representative in nature, and not all software architectures have all layers. For example, some mobile or special-purpose operating systems may not provide a frameworks/middleware 518, while others may provide such a layer. Other software architectures may include additional or different layers.

The operating system 502 may manage hardware resources and provide common services. The operating system 502 may include, for example, a kernel 522, services 524, and drivers 526. The kernel 522 may act as an abstraction layer between the hardware and the other software layers. For example, the kernel 522 may be responsible for memory management, processor management (e.g., scheduling), component management, networking, security settings, and so on. The services 524 may provide other common services for the other software layers. The drivers 526 are responsible for controlling or interfacing with the underlying hardware. For instance, the drivers 526 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 520 provide a common infrastructure that is used by the applications 516 and/or other components and/or layers. The libraries 520 provide functionality that allows other software components to perform tasks in an easier fashion than by interfacing directly with the underlying operating system 502 functionality (e.g., kernel 522, services 524, and/or drivers 526). The libraries 520 may include system libraries 544 (e.g., C standard library) that may provide functions such as memory allocation functions, string manipulation functions, mathematical functions, and the like. In addition, the libraries 520 may include API libraries 546 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 5D graphic content on a display), database libraries (e.g., SQLite that may provide various relational database functions), web libraries (e.g., WebKit that may provide web browsing functionality), and the like. The libraries 520 may also include a wide variety of other libraries 548 to provide many other APIs to the applications 516 and other software components/modules.

The frameworks/middleware 518 provide a higher-level common infrastructure that may be used by the applications 516 and/or other software components/modules. For example, the frameworks/middleware 518 may provide various graphic user interface (GUI) functions 542, high-level resource management, high-level location services, and so forth. The frameworks/middleware 518 may provide a broad spectrum of other APIs that may be utilized by the applications 516 and/or other software components/modules, some of which may be specific to a particular operating system or platform.

The applications 516 include built-in applications 538 and/or third-party applications 540. Examples of representative built-in applications 538 may include, but are not limited to, a contacts application, a browser application, a book reader application, a location application, a media application, a messaging application, and/or a game application. The third-party applications 540 may include any application developed using the ANDROID™ or IOS™ software development kit (SDK) by an entity other than the vendor of the particular platform and may be mobile software running on a mobile operating system such as IOS™, ANDROID™, WINDOWS® Phone, or other mobile operating systems. The third-party applications 540 may invoke the API calls 508 provided by the mobile operating system (such as the operating system 502) to facilitate functionality described herein.

The applications 516 may use built-in operating system functions (e.g., kernel 522, services 524, and/or drivers 526), libraries 520, and frameworks/middleware 518 to create user interfaces to interact with users of the system. Alternatively, or additionally, in some systems, interactions with a user may occur through a presentation layer, such as the presentation layer 514. In these systems, the application/component "logic" can be separated from the aspects of the application/component that interact with a user.

Some software architectures use virtual machines. In the example of FIG. 5, this is illustrated by a virtual machine 510. The virtual machine 510 creates a software environment where applications/components can execute as if they were executing on a hardware machine (such as the machine 600 of FIG. 6, for example). The virtual machine 510 is hosted by a host operating system (e.g., the operating system 502 in FIG. 5) and typically, although not always, has a virtual machine monitor 560, which manages the operation of the virtual machine 510 as well as the interface with the host operating system (e.g., the operating system 502). A software architecture executes within the virtual machine 510 such as an operating system (OS) 536, libraries 534, frameworks 532, applications 530, and/or a presentation layer 528. These layers of software architecture executing within the virtual machine 510 can be the same as corresponding layers previously described or may be different.

Figure 6:
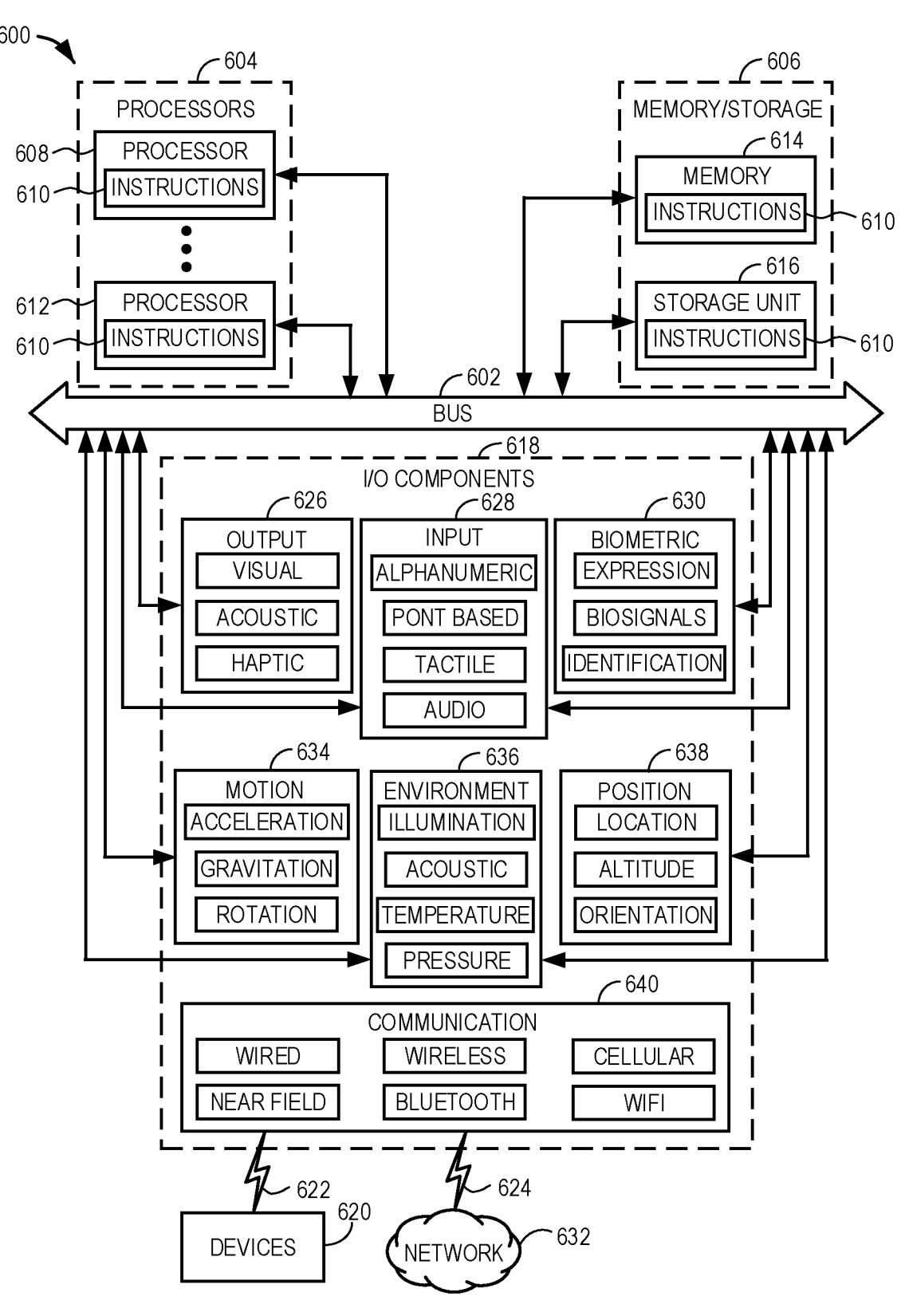
FIG. 6 is a block diagram illustrating components of a machine, according to some example embodiments, that is able to read instructions from a machine-readable medium (e.g., a machine-readable storage medium) and perform any one or more of the methodologies discussed herein.

FIG. 6 is a block diagram illustrating components of a machine 600, according to some example embodiments, that is able to read instructions from a machine-readable medium (e.g., a machine-readable storage medium) and perform any one or more of the methodologies discussed herein. Specifically, FIG. 6 shows a diagrammatic representation of the machine 600 in the example form of a computer system, within which instructions 610 (e.g., software, a program, an application, an applet, an app, or other executable code), for causing the machine 600 to perform any one or more of the methodologies discussed herein, may be executed. As such, the instructions 610 may be used to implement modules or components described herein. The instructions 610 transform the general, non-programmed machine 600 into a particular machine 600 programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 610, sequentially or otherwise, that specify actions to be taken by the machine 600. Further, while only a single machine 600 is illustrated, the term "machine" shall also be taken to include a collection of machines that individually or jointly execute the instructions 610 to perform any one or more of the methodologies discussed herein.

The machine 600 may include processors 604 (including processors 608 and 612), memory/storage 606, and I/O components 618, which may be configured to communicate with each other such as via a bus 602. The memory/storage 606 may include a memory 614, such as a main memory or other memory storage, and a storage unit 616, both accessible to the processors 604 such as via the bus 602. The storage unit 616 and memory 614 store the instructions 610 embodying any one or more of the methodologies or functions described herein. The instructions 610 may also reside, completely or partially, within the memory 614, within the storage unit 616, within at least one of the processors 604 (e.g., within the processor's cache memory), or any suitable combination thereof, during execution thereof by the machine 600. Accordingly, the memory 614, the storage unit 616, and the memory of the processors 604 are examples of machine-readable media.

The I/O components 618 may include a wide variety of components to receive input, provide output, produce output, transmit information, exchange information, capture measurements, and so on. The specific I/O components 618 that are included in a particular machine will depend on the type of machine. For example, portable machines such as mobile phones will likely include a touch input device or other such input mechanisms, while a headless server machine will likely not include such a touch input device. It will be appreciated that the I/O components 618 may include many other components that are not shown in FIG. 6. The I/O components 618 are grouped according to functionality merely for simplifying the following discussion; the grouping is in no way limiting. In various example embodiments, the I/O components 618 may include output components 626 and input components 628. The output components 626 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 628 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 618 may include biometric components 630, motion components 634, environment components 636, or position components 638, among a wide array of other components. For example, the biometric components 630 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 634 may include acceleration sensor components (e.g., accelerometer), gravitation sensor components, rotation sensor components (e.g., gyroscope), and so forth. The environment components 636 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 638 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 618 may include communication components 640, operable to couple the machine 600 to a network 632 or devices 620 via a coupling 624 and a coupling 622, respectively. For example, the communication components 640 may include a network interface component or other suitable device to interface with the network 632. In further examples, the communication components 640 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 620 may be another machine or any of a wide variety of peripheral devices (e.g., a peripheral device coupled via a USB).

Moreover, the communication components 640 may detect identifiers or include components operable to detect identifiers. For example, the communication components 640 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 640, such as location via Internet Protocol (IP) geo-location, location via Wi-Fi® signal triangulation, location via detecting an NFC beacon signal that may indicate a particular location, and so forth.

"Carrier Signal" in this context refers to any intangible medium that is capable of storing, encoding, or carrying instructions for execution by a machine, and includes digital or analog communication signals or other intangible media to facilitate communication of such instructions. Instructions may be transmitted or received over a network using a transmission medium via a network interface device and using any one of a number of well-known transfer protocols.

"Client Device" or "Electronic Device" in this context refers to any machine that interfaces to a communications network to obtain resources from one or more server systems or other client devices. A client device may be, but is not limited to, a mobile phone, desktop computer, laptop, portable digital assistant (PDA), smart phone, tablet, ultrabook, netbook, laptop, multi-processor system, microprocessor-based or programmable consumer electronic system, game console, set-top box, or any other communication device that a user may use to access a network.

"Customer's Electronic Device" or "Electronic User Device" in this context refers to a client device that a customer uses to interact with a merchant. Examples of this device include a desktop computer, a laptop computer, a mobile device (e.g., smart phone, tablet), and a game console. The customer's electronic device may interact with the merchant via a browser application that executes on the customer's electronic device or via a native app installed onto the customer's electronic device. The client-side application executes on the customer's electronic device.

"Communications Network" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"Component" in this context refers to a device, physical entity, or logic having boundaries defined by function or subroutine calls, branch points, application programming interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a stand-alone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instant in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instant of time and to constitute a different hardware component at a different instant of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Machine-Readable Medium" in this context refers to a component, device, or other tangible medium able to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"Processor" in one context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multicore processor having two or more independent processors (sometimes referred to as "cores") that may execute instructions contemporaneously.

In another context, a "Processor" is a company (often a third party) appointed to handle payment card (e.g., credit card, debit card) transactions. They have connections to various card networks and supply validation and settlement services to merchants or payment service providers. In aspects, they can also move the money from an issuing bank to a merchant or acquiring bank.

"Card Network" (or "Card Association") in this context refers to financial payment networks such as Visa®, MasterCard®, American Express®, Diners Club®, JCB®, and China Union-Pay®.

"Acquiring Bank" or "Acquirer" in this context refers to a bank or financial institution that accepts credit and/or debit card payments from affiliated card networks for products or services on behalf of a merchant or payment service provider.

"Card Issuing Bank" or "Issuing Bank" in this context refers to a bank that offers card network or association-branded payment cards directly to consumers. An issuing bank assumes primary liability for the consumer's capacity to pay off debts they incur with their card.

"Payment Information" includes information generally required to complete a transaction, and the specific type of information provided may vary by payment type. Some payment information will be sensitive (e.g., the card validation code), while other information might not be (e.g., a zip code). For example, when a payment is made via a credit card or debit card, the payment information includes a primary account number (PAN) or credit card number, card validation code, and expiration month and year. In another payment example, made using an Automated Clearinghouse (ACH) transaction for example, the payment information includes a bank routing number and an account number within that bank.

"Merchant" in this context refers to an entity that is associated with selling or licensing products and/or services over electronic systems such as the Internet and other computer networks. The merchant may be the direct seller/licensor, or the merchant may be an agent for a direct seller/licensor. For example, entities such as Amazon® sometimes act as the direct seller/licensor, and sometimes act as an agent for a direct seller/licensor.

"Merchant Site" in this context refers to an e-commerce site or portal (e.g., website, or mobile app) of the merchant. In some embodiments, the merchant and merchant servers are associated with the merchant site. The merchant site is associated with a client-side application and a server-side application.

"Payment Processor" in this context refers to an entity or a plurality of entities and associated software components and/or hardware components (e.g., hardware processors, virtual processors executing on top of hardware processors, servers, computing platforms, storage, security mechanisms, encryption hardware/devices), among other types of computing resources (e.g., network, bandwidth, CPU processing, and the like) that facilitate and process a transaction, for example between a merchant and a customer's electronic device.

"Native Application" or "native app" in this context refers to an app commonly used with a mobile device, such as a smart phone or tablet. When used with a mobile device, the native app is installed directly onto the mobile device. Mobile device users typically obtain these apps through an online store or marketplace, such as an app store (e.g., Apple's App Store, Google Play store). More generically, a native application is designed to run in the computer environment (machine language and operating system) that it is being run in. It can be referred to as a "locally installed application." A native application differs from an interpreted application, such as a Java applet, which may require interpreter software. A native application also differs from an emulated application that is written for a different platform and converted in real time to run, and a web application that is run within the browser.

Although the subject matter has been described with reference to specific example embodiments, it will be evident that various modifications and changes may be made to these embodiments without departing from the broader spirit and scope of the disclosed subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by any appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:

accessing historical transaction data, for a transaction network, from a database;

applying one or more transformations to a piece of the historical transaction data by at least adding an indicator, to the historical transaction data, that a corresponding transaction was performed from a known bot IP address;

generating a training data set by (1) mapping a subset of fields of the piece of the historical transaction data to corresponding fields of a plurality of fields in an event data structure based on a first mapping, of a plurality of mappings maintained between a plurality of transaction types and the event data structure, for a first transaction type associated with the piece of the historical transaction data and (2) appending a label, to the event data structure, indicating an outcome for the corresponding transaction represented in the event data structure, wherein the plurality of transaction types includes the first transaction type and a second transaction type, and wherein the plurality of mappings includes:
the first mapping, and
a second mapping, for the second transaction type, that is different from the first mapping; and retraining a machine learning model using the training data set after the machine learning model is trained previously, after applying the one or more transformations to the piece of the historical transaction data, and after generating the training data set by mapping the subset of fields of the piece of the historical transaction data to the corresponding fields of the plurality of fields in the event data structure.

2. The method of claim 1, further comprising:
applying the machine learning model to a potential transaction to output a score evaluation of the potential transaction;
comparing the score evaluation to a first threshold; and
blocking the potential transaction based on the score evaluation satisfying the first threshold.

3. The method of claim 1, further comprising:
applying the machine learning model to a potential transaction to output a score evaluation of the potential transaction;
comparing the score evaluation to a first threshold and a second threshold;
performing one or more interventions based on the score evaluation exceeding the second threshold but not the first threshold; and
blocking the potential transaction if the one or more interventions are not satisfied.

4. The method of claim 3, wherein the one or more interventions include invoking an application, on a mobile device of a payor in the potential transaction, that accesses a camera to photograph a physical card.

5. The method of claim 3, wherein the one or more interventions include two-factor authentication.

6. The method of claim 1, wherein the machine learning model is trained using a supervised gradient boosted trees algorithm.

7. The method of claim 1, further comprising:
applying the machine learning model by extracting a plurality of features from data pertaining to a potential transaction,
the plurality of features including counter features, and
the counter features including features pertaining to transactions of a different payment type than a payment type of the potential transaction.

8. The method of claim 1, wherein applying the one or more transformations to the piece of the historical transaction data comprises:
augmenting a raw IP address, in the piece of the historical transaction data, with an identifier of a geographic location; and
adding, to the piece of the historical transaction data, the indicator that the corresponding transaction was performed from a known bot IP address.

9. The method of claim 1, wherein the one or more transformations include two or more transformations.

10. The method of claim 1, wherein the first mapping indicates that one or more values, of the subset of fields of the piece of the historical transaction data, maps to a single field of the corresponding fields of the plurality of fields in the event data structure.

11. The method of claim 1,
wherein the corresponding fields of the plurality of fields in the event data structure are first corresponding fields of the plurality of fields in the event data structure,
wherein the first mapping is between a first quantity of fields, of the first transaction type, and the first corresponding fields of the plurality of fields in the event data structure,
wherein the second mapping is between a second quantity of fields, of the second transaction type, and second corresponding fields of the plurality of fields in the event data structure, and
wherein the second quantity of fields is different from the first quantity of fields.

12. The method of claim 1, wherein a quantity of the subset of fields of the piece of the historical transaction data is greater than a quantity of the corresponding fields of the plurality of fields in the event data structure.

13. A system comprising:
one or more processors, and
at least one memory storing instructions that, when executed by at least one processor among the one or more processors, cause the at least one processor to perform operations comprising:
accessing historical transaction data, for a transaction network;
applying two or more transformations to one or more portions of historical transaction data by at least adding an indicator, to the historical transaction data, that a corresponding transaction was performed from a known bot IP address;
generating a training data set by (1) mapping a subset of fields of the piece of the historical transaction data to corresponding fields of a plurality of fields in an event data structure based on a first mapping, of a plurality of mappings between a plurality of transaction types and the event data structure, for a first transaction type associated with the piece of the historical transaction data and (2) appending a label, to the event data structure, indicating an outcome for the corresponding transaction represented in the event data structure,
wherein the plurality of transaction types includes the first transaction type and a second transaction type, and
wherein the plurality of mappings includes:
the first mapping, and
a second mapping, for the second transaction type, that is different from the first mapping; and
retraining a machine learning model using the training data set after the machine learning model is trained previously, after applying the one or more transformations to the piece of the historical transaction data and after generating the training data set by mapping the subset of fields of the piece of the historical transaction data to the corresponding fields of the plurality of fields in the event data structure.

14. The system of claim 13, wherein the operations further comprise:
blocking a potential transaction based on applying the machine learning model to the potential transaction.

15. The system of claim 13, wherein the operations further comprise:

performing one or more interventions based on applying the machine learning model to a potential transaction; and blocking the potential transaction if the one or more interventions are not satisfied.

16. The system of claim 15, wherein the one or more interventions includes invoking an application, on a mobile device of a payor in the potential transaction, that accesses a camera to photograph a physical payment card of the payor.

17. The system of claim 15, wherein the one or more interventions include two-factor authentication.

18. The system of claim 13, wherein the operations further comprise:

applying the machine learning model by extracting a plurality of features, from data pertaining to a potential transaction, pertaining to transactions of a different type than a type of the potential transaction.

19. A non-transitory machine-readable medium, storing instructions which, when executed by a machine, cause the machine to perform operations comprising:

accessing historical transaction data, for a transaction network;

applying one or more transformations to a piece of historical transaction data by at least adding an indicator, to the historical transaction data, that a corresponding transaction was performed from a known bot IP address;

generating a training data set by (1) mapping a subset of fields of the piece of the historical transaction data to corresponding fields of a plurality of fields in an event data structure based on a first mapping, of a plurality of mappings maintained between a plurality of transaction types and the event data structure, for a first transaction type associated with the piece of the historical transaction data and (2) appending a label, to the event data structure, indicating an outcome for the corresponding transaction represented in the event data structure, wherein the plurality of transaction types includes the first transaction type and a second transaction type, and wherein the plurality of mappings includes:

the first mapping, and a second mapping, for the second transaction type, that is different from the first mapping; and retraining a machine learning model using the training data set after the machine learning model is trained previously, after applying the one or more transformations to the piece of the historical transaction data and after generating the training data set by mapping the subset of fields of the piece of the historical transaction data to the corresponding fields of the plurality of fields in the event data structure.

20. The non-transitory machine-readable medium of claim 19, wherein the operations further comprise:

applying, after training the machine learning model, the machine learning model to a potential transaction; and blocking the potential transaction based on applying the machine learning model to the potential transaction.

21. The non-transitory machine-readable medium of claim 20, wherein the operations further comprise:

performing one or more interventions before blocking the potential transaction.

22. The non-transitory machine-readable medium of claim 21, wherein the one or more interventions includes invoking an application, on a mobile device of a payor in the potential transaction, that accesses a camera to photograph a physical payment card of the payor.

23. The non-transitory machine-readable medium of claim 19, wherein the machine learning training process is a supervised gradient boosted trees algorithm.

* * * * *